United States Patent [19]

Ko

[11] Patent Number: 5,778,921
[45] Date of Patent: Jul. 14, 1998

[54] RELAY CONTROLLING VALVE STRUCTURE FOR TWIN-TAP FAUCET

[75] Inventor: Hsi-Chia Ko, Changhua Hsien, Taiwan

[73] Assignee: Chung Cheng Faucet Co., Ltd., Changhua Hsien, Taiwan

[21] Appl. No.: 653,926

[22] Filed: May 22, 1996

[51] Int. Cl.$^6$ ............................................. F16K 11/044
[52] U.S. Cl. ........................... 137/119.04; 137/119.06
[58] Field of Search ..................... 137/119.03, 119.04, 137/119.06

[56] References Cited

U.S. PATENT DOCUMENTS

| Re. 32,981 | 7/1989 | Marty | 137/119.04 |
|---|---|---|---|
| 4,609,006 | 9/1986 | Parkison et al. | 137/119.04 |
| 4,798,221 | 1/1989 | Crawford et al. | 137/119.04 |

Primary Examiner—Stephen M. Hepperle
Attorney, Agent, or Firm—Browdy and Neimark

[57] ABSTRACT

A relay controlling valve structure for twin-tap faucet, including a valve seat, a valve stem and a pushing block. The valve seat is a hollow sleeve-like member made of plastic material and formed with outer thread on upper portion. A water-sealing ring is disposed around a middle portion of the valve seat. An annular groove is formed between the water-sealing ring and the lower end of the valve seat. Two opposite water inlets are formed on the wall of the upper portion of the annular groove. A hexagonal socket is formed at upper end of the valve seat. A stem hole is formed below the hexagonal socket. The upper portion of the stem hole has s conic face and the lower portion of the stem hole is enlarged. Several stopper ribs are disposed on the wall of the enlarged lower portion at intervals. Each stopper rib has a shorter guiding rib extending toward the center for guiding the valve stem to linearly move up and down. The lower end of the enlarged lower portion is further enlarged into a conic shape. A stem head is formed at the upper end of the valve stem. A reverse conic water-sealing washer is inserted at the adjoining portion between the stem body and the stem head. The lower end of the stem body is formed with an insertion groove. The pushing block is a conic body made of rubber material with a plane head and formed with a central fitting hole. The bottom of the pushing block is formed with an annular check groove.

1 Claim, 5 Drawing Sheets

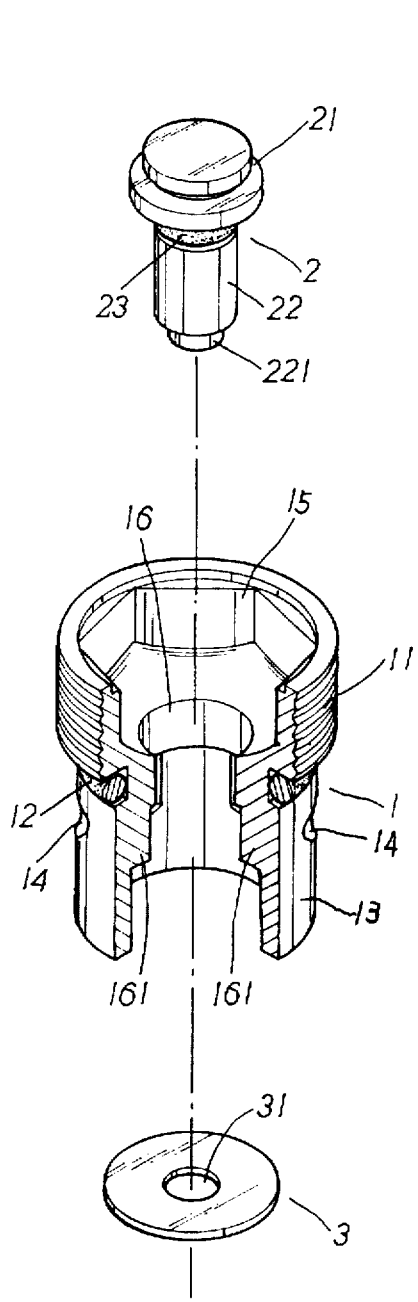
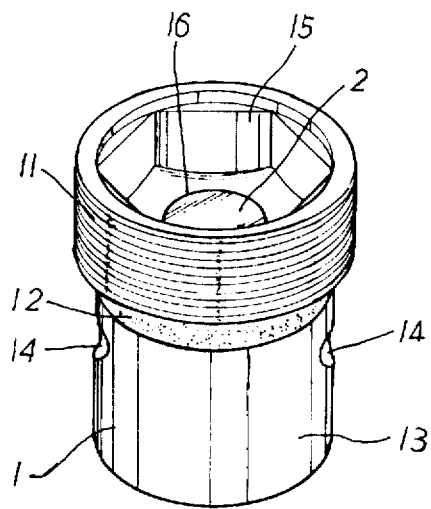
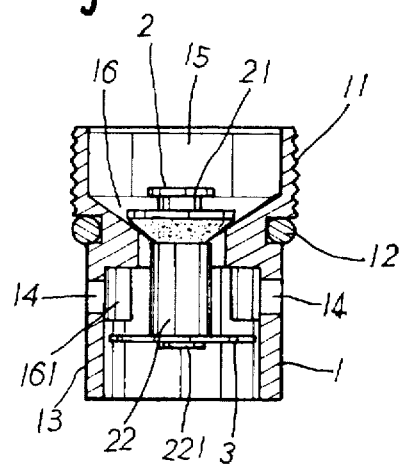
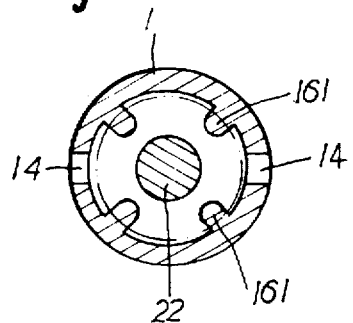
Fig. 1-1 Prior Art
Fig. 1-2 Prior Art
Fig. 1-3 Prior Art
Fig. 1-4 Prior Art

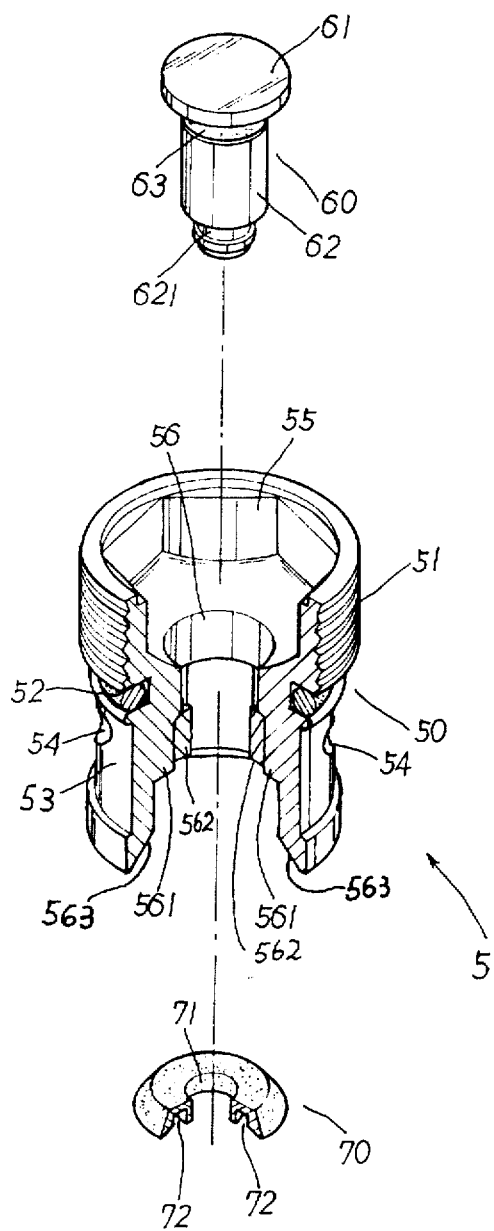
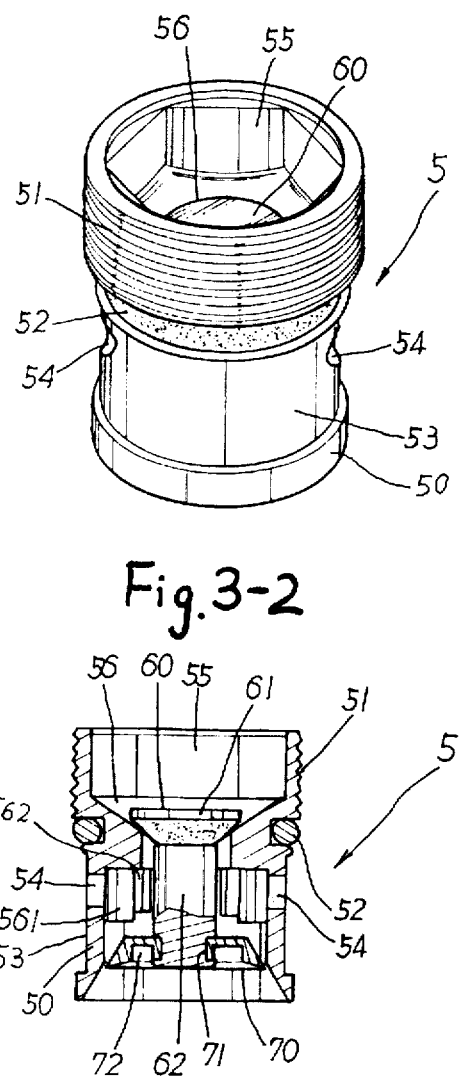
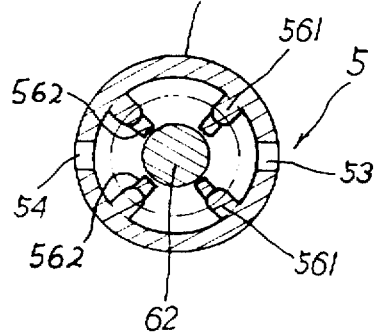
Fig. 3-1
Fig. 3-2
Fig. 3-3
Fig. 3-4

RELAY CONTROLLING VALVE STRUCTURE FOR TWIN-TAP FAUCET

BACKGROUND OF THE INVENTION

The present invention relates to a relay controlling valve structure for twin-tap faucet, including a valve seat, a valve stem and a pushing block.

Referring to FIGS. 1-1, 1-2, 1-3 and 1-4. A conventional relay controlling valve includes a valve seat 1, a valve stem 2 and a water disk 3. The valve seat 1 is a hollow sleeve-like member made of plastic material and formed with outer thread 11 on upper portion. A water-sealing ring 12 is disposed around a middle portion of the valve seat 1. Two opposite water inlets 14 are formed on the wall of the lower portion of the valve seat below the water-sealing ring 12. A hexagonal socket 15 is formed at upper end of the valve seat for a wrench to fit therein and drive the valve seat. A stem hole 16 is formed below the hexagonal socket 15. The upper portion of the stem hole 16 has conic face and the lower portion of the stem hole 16 is enlarged. Several stopper ribs 161 are disposed on the wall of the enlarged lower portion at intervals. A stem head 21 is formed at the upper end of the valve stem 2. A reverse conic water-sealing washer 23 is inserted at the adjoining portion between the stem body 22 and the stem head 21. A small diameter rivet portion 221 is disposed at the end of the stem body 22. The water disk 3 is formed with a central rivet hole 31.

When assembled, the stem body 22 of the valve stem 2 is passed through the hexagonal socket 15 of the valve seat 1 and fitted into the stem hole 16 thereof. The reverse conic water-sealing washer 23 is fitted with the conic face of the stem hole 16 of the valve seat 1. The rivet portion 221 of the stem body 22 is positioned below the stopper ribs 161 of the enlarged lower portion of the stem hole 16. Then the water disk 3 is upward fitted into the enlarged lower portion of the stem hole 16 with the rivet hole 31 of the water disk 3 riveted with the rivet portion 221 of the stem body 22.

FIG. 2 is a sectional assembled view of the conventional controlling valve, wherein the outer thread 11 of the valve seat 1 is screwed into the inner thread of a middle relay portion of a double-way faucet seat 4 having an upper and a lower water discharging passages 41, 42. The upper water discharging passage 41 is connected with a water discharging neck portion 411, while the lower water discharging passage 42 is connected with a conduit 422 of a flushing head 421. The opposite water inlets 14 of the valve seat 1 are aligned with the water supplying openings of the faucet seat 4. When the flushing head 421 is closed, because the lower water discharging passage 42 is blocked, the water flow coming from the faucet seat 4 is guided into the water inlets 14 of the valve seat 1 to upward push the valve stem 2, making the top face of the water disk 3 engaged with the lower ends of the stopper ribs 161 of the stem hole 16 of the valve seat 1. Therefore, the reverse conic water-sealing washer 23 of the valve stem 2 is separated from the conic face of the stem hole 16 to define a clearance. The water thereby can flow upward through the clearance and the upper water discharging passage 41 to be discharged from the neck portion 411. On the other hand, when the flushing head 421 is opened, the high water pressure caused by the blocking of the lower water discharging passage 42 is eliminated and the water flow tends to abruptly flow from the upper water discharging passage toward the lower water discharging passage 42, that is, flow downward through the clearance between the water disk 3 and the inner wall of the enlarged lower portion of the stem hole 16. Moreover, because the water disk 30 is positioned below the water inlets 13, 14, the valve stem 2 is driven downward, making the reverse conic water-sealing washer 23 close the conic face of the stem hole 16 of the valve seat 1 so as to seal the upper water discharging passage 41.

According to the above arrangement, several shortcoming exist as follows: 1. When the valve stem 2 moves up and down within the valve seat 1, the valve stem is free from any guiding so that the valve stem is apt to deflect. This will prevent the valve stem from being smoothly shifted up and down. Moreover, the wall 13 of the valve seat 1 below the water-sealing ring 12 is free from any dented portion so that the water contained in the space between the wall 13 and the wall of the water supplying openings of the water discharging passages is limited. Therefore, in the case of low pressure water supply, the valve stem 2 often cannot be pushed up and down; 2. The water disk 30 is a hard member so that after a period of use, the impurities in the water is apt to block the clearance between the water disk 3 and the wall of the enlarged lower portion of the stem hole 16 to prevent the valve stem 2 from being smoothly shifted up and down. This will affect the automatic switching operation; and 3. In the case of fire, the flushing head 421 is very likely to be immersed in a dirty or chemical water. At this time, the fireman will continuously take water from the same pipeline for extinguishing the fire. The water source of the fireplug is the same as the domestic drinking water. Therefore, when the fireman takes a great amount of water to create a sucking force, the dirty or chemical water at the flushing head 421 will be sucked and dispersed to the respective families through the same pipeline. This seriously affects the quality of the drinking water.

SUMMARY OF THE INVENTION

It is therefore a primary object of the present invention to provide a relay controlling valve structure for twin-tap faucet, including a valve seat, a valve stem and a pushing block. The annular groove of the valve seat and the partitioning wall of the water discharging passages define a larger space with greater capacity for the water flow so that the valve stem can be more easily linearly pushed up and down and the valve seat is suitable for both high and low water pressure.

It is a further object of the present invention to provide the above relay controlling valve structure in which the stem body of the valve stem is guided by the guiding ribs of the valve seat to smoothly linearly move up and down. In addition, the conic bottom edge of the pushing block can be inward constricted to the check groove so that the impurities in the water can be easily exhausted without blocking the controlling valve to ensure that the valve stem can be smoothly moved up and down automatically switched.

It is still a further object of the present invention to provide the above relay controlling valve in which the pushing block is provided with a check groove so that no flowing back condition will take place in the relay controlling valve and in the case of a fire, the dirty or chemical water at the flushing head will be prevented from being sucked back and dispersed to the respective families through the same pipeline. Therefore, the safety of water source is ensured.

The present invention can be best understood through the following description and accompanying drawings, wherein:

BRIEF DESCRIPTION OF THE DRAWINGS

FIG. 1-1 is a perspective exploded view of a conventional relay controlling valve;

FIG. 1-2 is a perspective assembled view of the conventional relay controlling valve;

FIG. 1-3 is a longitudinal sectional view of the conventional relay controlling valve;

FIG. 1-4 is a cross-sectional view of the conventional relay controlling valve;

FIG. 2 is a partially sectional perspective view showing the application of the conventional relay controlling valve to a twin-tap faucet;

FIG. 3-1 is a perspective exploded view of the present invention;

FIG. 3-2 is a perspective assembled view of the present invention;

FIG. 3-3 is a longitudinal sectional view of the present invention;

FIG. 3-4 is a cross-sectional view of the present invention;

FIG. 4-1 shows that the water is discharged from the upper water discharging passage according to the present invention;

FIG. 4-2 shows that the water is discharged from the lower water discharging passage according to the present invention.

DETAILED DESCRIPTION OF THE PREFERRED EMBODIMENT

Figures 1, 4:
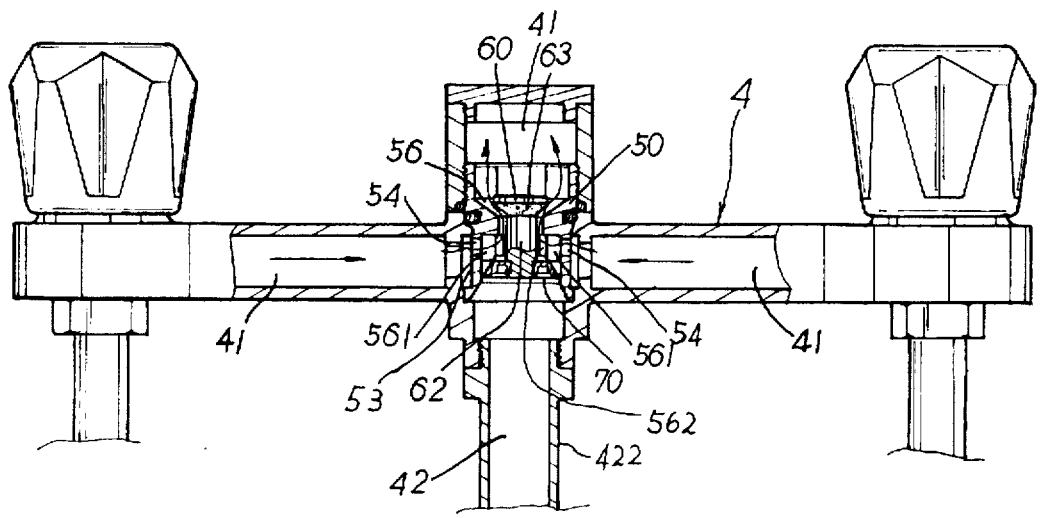
Figures 2, 4:
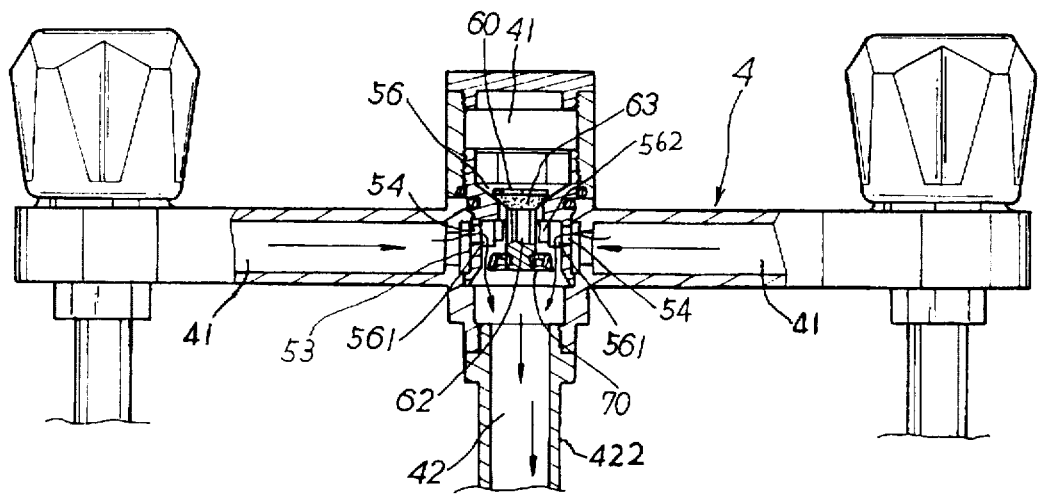

Please refer to FIGS. 3-1 to 3-4. The relay controlling valve 5 includes a valve seat 50, a valve stem 60 and a pushing block 70. The valve seat 50 is a hollow sleeve-like member made of plastic material and formed with outer thread 51 on upper portion. A water-sealing ring 52 is disposed around a middle portion of the valve seat 50. An annular groove 53 is formed between the water-sealing ring 52 and the lower end of the valve seat 50. Two opposite water inlets 54 are formed on the wall of the upper portion of the annular groove 53. A hexagonal socket 55 is formed at upper end of the valve seat for a wrench to fit therein and drive the valve seat. A stem hole 55 is formed below the hexagonal socket 55. The upper portion of the stem hole 56 has conic face and the lower portion of the stem hole 56 is enlarged. Several stopper ribs 561 are disposed on the wall of the enlarged lower portion at intervals for stopping the pushing block 70. Each stopper rib 561 has a shorter guiding rib 562 extending toward the center for guiding the valve stem 60 to linearly move up and down. Moreover, the wall of the lower end of the enlarged lower portion is further enlarged into a conic shape 563. A stem head 61 is formed at the upper end of the valve stem 60. A reverse conic water-sealing washer 63 is inserted at the adjoining portion between the stem body 62 and the stem head 61. An insertion groove 621 is disposed at the end of the stem body 62. The pushing block 70 is a conic body made of rubber material with a plane head and formed with a central fitting hole 71. The bottom of the pushing block 70 is formed with an annular check groove 72.

When assembled, the stem body 62 of the valve stem 60 is passed through the hexagonal socket 55 of the valve seat 50 and fitted into the stem hole 56 thereof. The reverse conic water-sealing washer 63 is fitted with the conic face of the stem hole 56 of the valve seat 50. The insertion groove 621 of the stem body 62 is positioned below the stopper ribs 561 of the enlarged lower portion of the stem hole 56. The stem body 62 slightly contacts with the guiding ribs 562 of the stopper ribs 561. Then the pushing block 70 is upward fitted into the enlarged lower portion of the stem hole 56 with the fitting hole 71 of the pushing block 70 resiliently fitted with the insertion groove 621 of the stem body 62.

FIG. 4-1 is a sectional assembled view of the conventional controlling valve, wherein the outer thread 51 of the valve seat 50 is screwed into the inner thread of a middle relay portion of a double-way faucet seat 4 having an upper and a lower water discharging passages 41, 42. The upper water discharging passage 41 is connected with a water discharging neck portion 411, while the lower water discharging passage 42 is connected with a conduit 422 of a flushing head 421. The opposite water inlets 54 of the valve seat 50 are aligned with the water supplying openings of the faucet seat 4. The annular groove 59 of the valve seat 50 and the partitioning wall of the water supplying passage define a larger space with greater capacity for both high and low water pressure. When the flushing head 421 is closed, because the lower water discharging passage 42 is blocked, the water flow coming from the faucet seat is guided into the water inlets 54 of the valve seat 50 to upward push the valve stem 60, making the stem body 62 guided by the guiding ribs 562 of the valve seat 50 to linearly move upward. The top face of the pushing block 70 is thus engaged with the lower ends of the stopper ribs 561 of the stem hole 56 of the valve seat 50. Therefore, the reverse conic water-sealing washer 63 of the valve stem 60 is separated from the conic face of the stem hole 56 to define a clearance. The water thereby can flow upward through the clearance and the upper water discharging passage 41 to be discharged from the neck portion 411.

Figure 2:
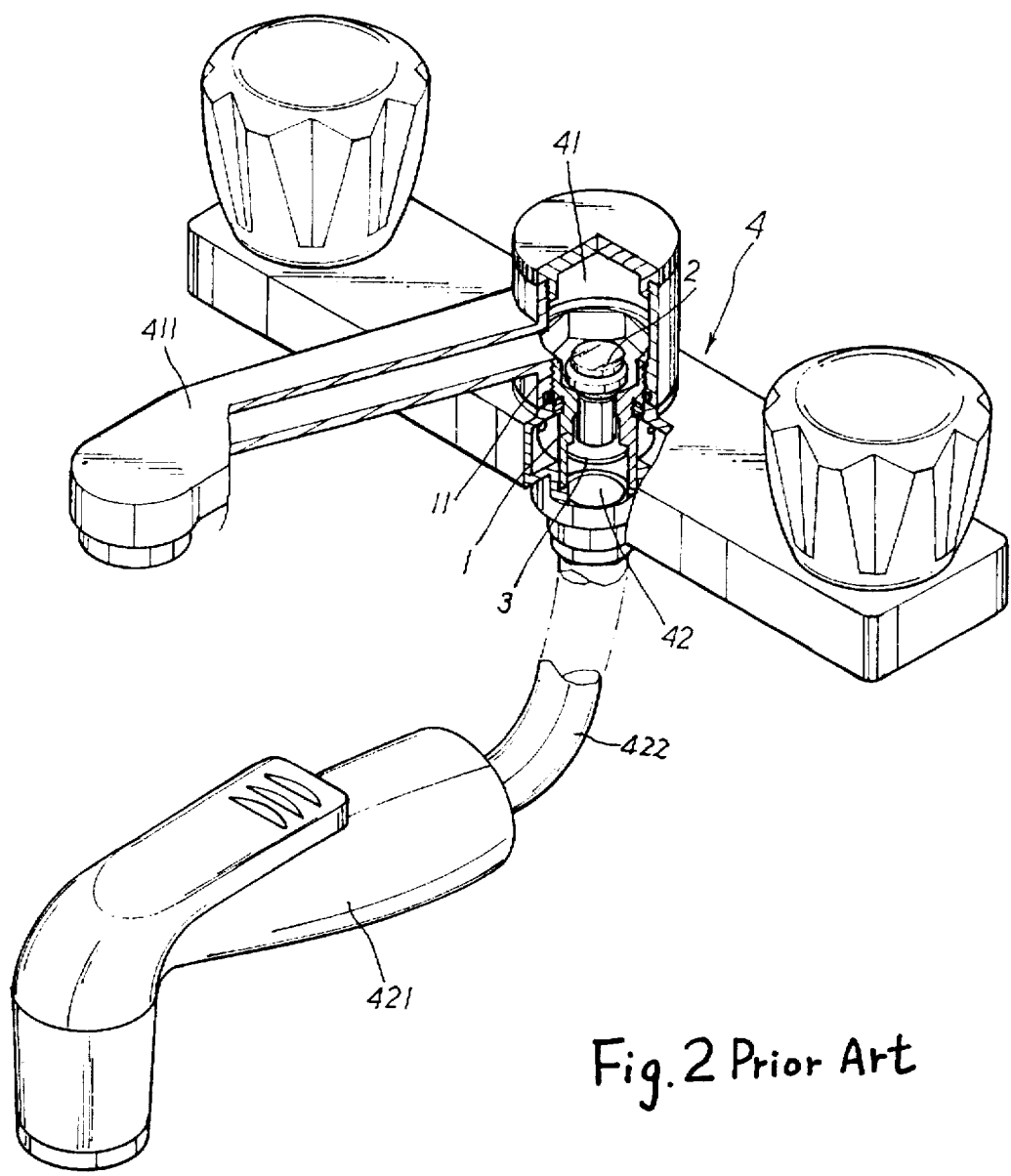

On the other hand, referring to FIG. 4-2, when the flushing head 421 is opened, the high water pressure caused by the blocking of the lower water discharging passage 42 is eliminated and the water flow tends to abruptly flow from the upper water discharging passage toward the lower water discharging passage 42, making the stem body 62 of the valve stem 60 guided by the guiding ribs 562 of the valve seat 50 to linearly move downward, whereby the conic bottom edge of the pushing block 70 is inward constricted by means of the water pressure and the check groove 72. Therefore, the water flows downward through the enlarged conic portion 563 and the clearance between the pushing block 70 and the inner wall of the enlarged lower portion of the stem hole 56. Accordingly, the impurities in the water can be also exhausted. Moreover, because the pushing block 70 is positioned below the water inlets 54, the top face of the pushing block 70 is downward pressed by the downward flowing water. At this time, the valve stem 60 is driven downward, making the reverse conic water-sealing washer 63 close the conic face of the stem hole 56 of the valve seat 50 so as to seal the upper water discharging passage 41.

Figure 5:
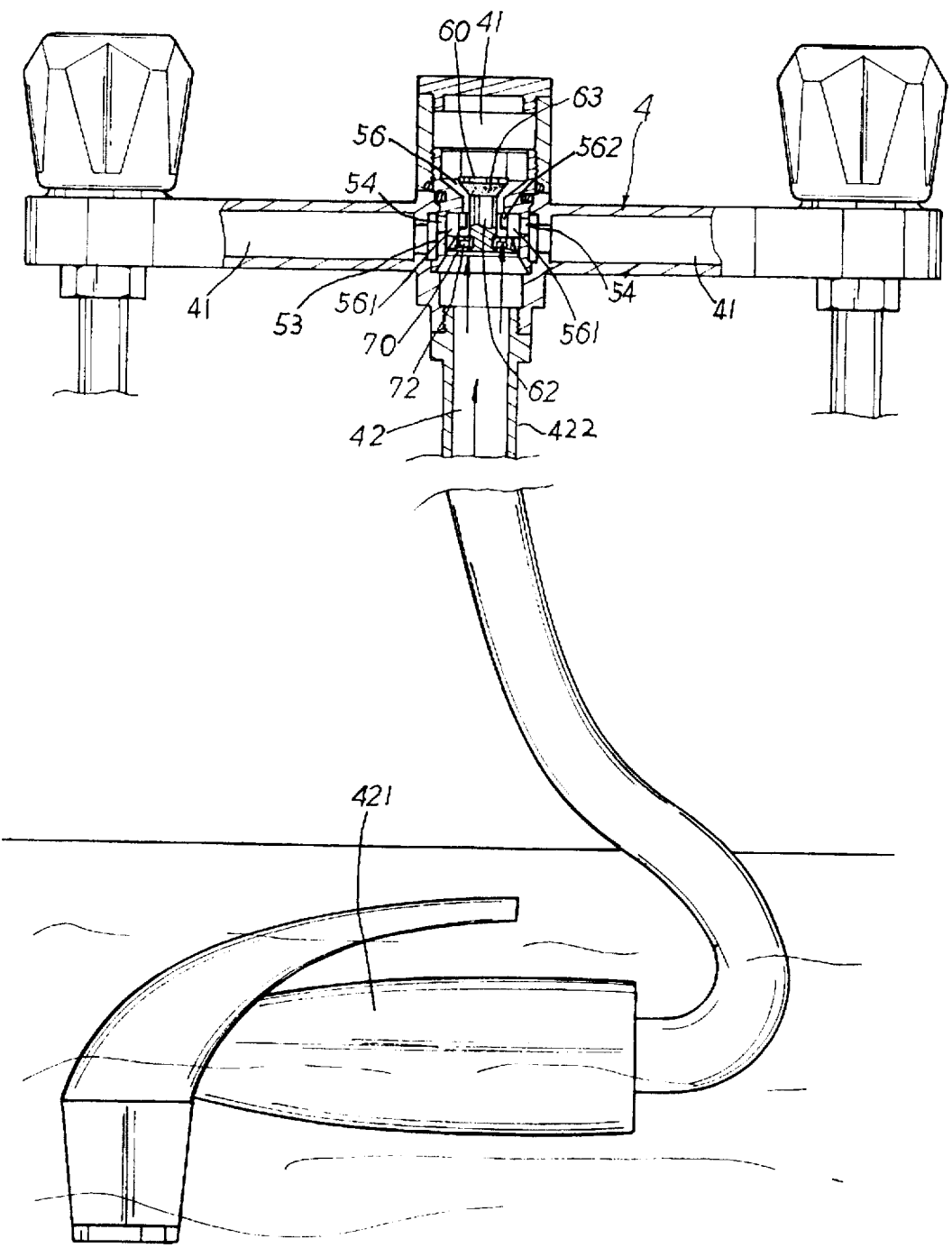
FIG. 5 shows that the water is prevented from flowing back according to the present invention.

Please refer to FIG. 5. In the case of a fire, the flushing head 421 is very likely to be immersed in a dirty or chemical water. At this time, the fireman will continuously take water from the same pipeline for extinguishing the fire. At this time, a back sucking force is created at the water inlets 54 of the valve seat 50. Because the pushing block 70 is positioned below the water inlets 54, an upward back sucking is created and the flushing head 421 under the back sucking force will suck the dirty or chemical water. The conic bottom edge of the pushing block 70 by means of the check groove 72 is expanded outward to abut against the inner wall of the enlarged lower portion of the stem hole 56. The greater the back sucking force is, the more the conic bottom edge of the pushing block 70 is expanded outward. Therefore, in the case of a fire, the dirty or chemical water at the flushing head 421 will be prevented from being sucked back and dispersed to the respective families through the same pipeline.

According to the above arrangement, the present invention has the following advantages:

1. The annular groove 53 of the valve seat 50 and the partitioning wall of the water discharging passages 41 define a larger space with greater capacity for the water flow so that the valve seat is suitable for both high and low water pressure.

2. The stem body 62 of the valve stem 60 is guided by the guiding ribs 562 of the valve seat 50 to smoothly linearly move up and down. In addition, the conic bottom edge of the pushing block 70 can be inward constricted to the check groove 72 so that the impurities in the water can be easily exhausted to ensure that the valve stem 60 can be automatically switched.

3. The pushing block is provided with a check groove so that no flowing back condition will take place in the relay controlling valve to ensure the safety of water source.

The above embodiment is only an example of the present invention and the scope of the present invention should not be limited to the example. Any modification or variation derived from the example should fall within the scope of the present invention.

What is claimed is:

1. A relay controlling valve structure for twin-tap faucet, comprising a valve seat, a valve stem and a pushing block, wherein the valve seat is a hollow sleeve-like member made of plastic material and formed with outer thread on upper portion, a water-sealing ring being disposed around a middle portion of the valve seat, a hexagonal socket being formed at upper end of the valve seat for a wrench to fit therein and drive the valve seat, a stem hole being formed below the hexagonal socket, the upper portion of the stem hole having conic face and the lower portion of the stem hole being enlarged, several stopper ribs being disposed on the wall of the enlarged lower portion at intervals, a stem head being formed at the upper end of the valve stem, a reverse conic water-sealing washer being inserted at the adjoining portion between the stem body and the stem head, the stem body of the valve stem being passed through the hexagonal socket of the valve seat and fitted into the stem hole thereof, the reverse conic water-sealing washer being fitted with the conic face of the stem hole of the valve seat, said controlling valve structure being characterized in that:

an annular groove is formed between the water-sealing ring and the lower end of the valve seat, the annular groove of the valve seat and the partitioning wall of the water discharging passages defining a larger space with greater capacity for the water flow so as to more easily push the pushing block, two opposite water inlets being formed on the wall of the upper portion of the annular groove, each stopper rib having a shorter guiding rib extending toward the center for guiding the valve stem to linearly move up and down, the wall of the lower end of the enlarged lower portion being further enlarged into a conic shape, the lower end of the stem body being formed with an insertion groove, the pushing block being a conic body made of rubber material with a plane head and formed with a central fitting hole for fitting with the insertion groove of the stem body, the bottom of the pushing block being formed with an annular check groove.

* * * * *